Dec. 23, 1924.
E. P. KENDALL
VEGETABLE HARVESTER
Filed Oct. 19, 1920
1,520,577
3 Sheets-Sheet 3
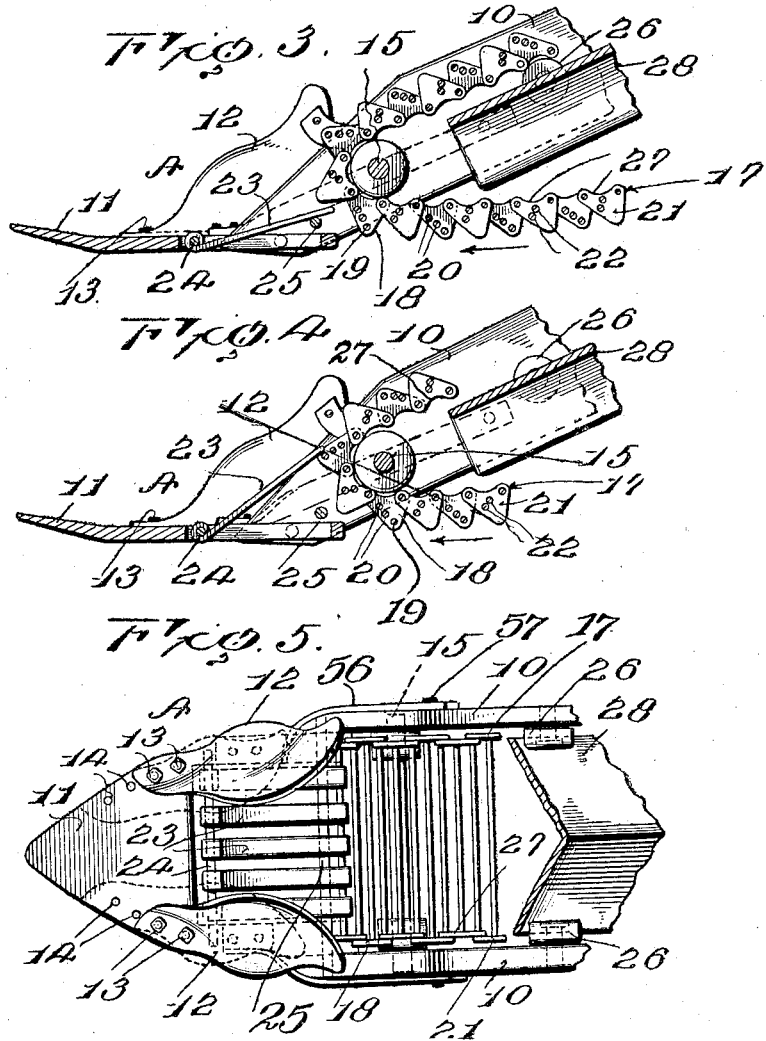

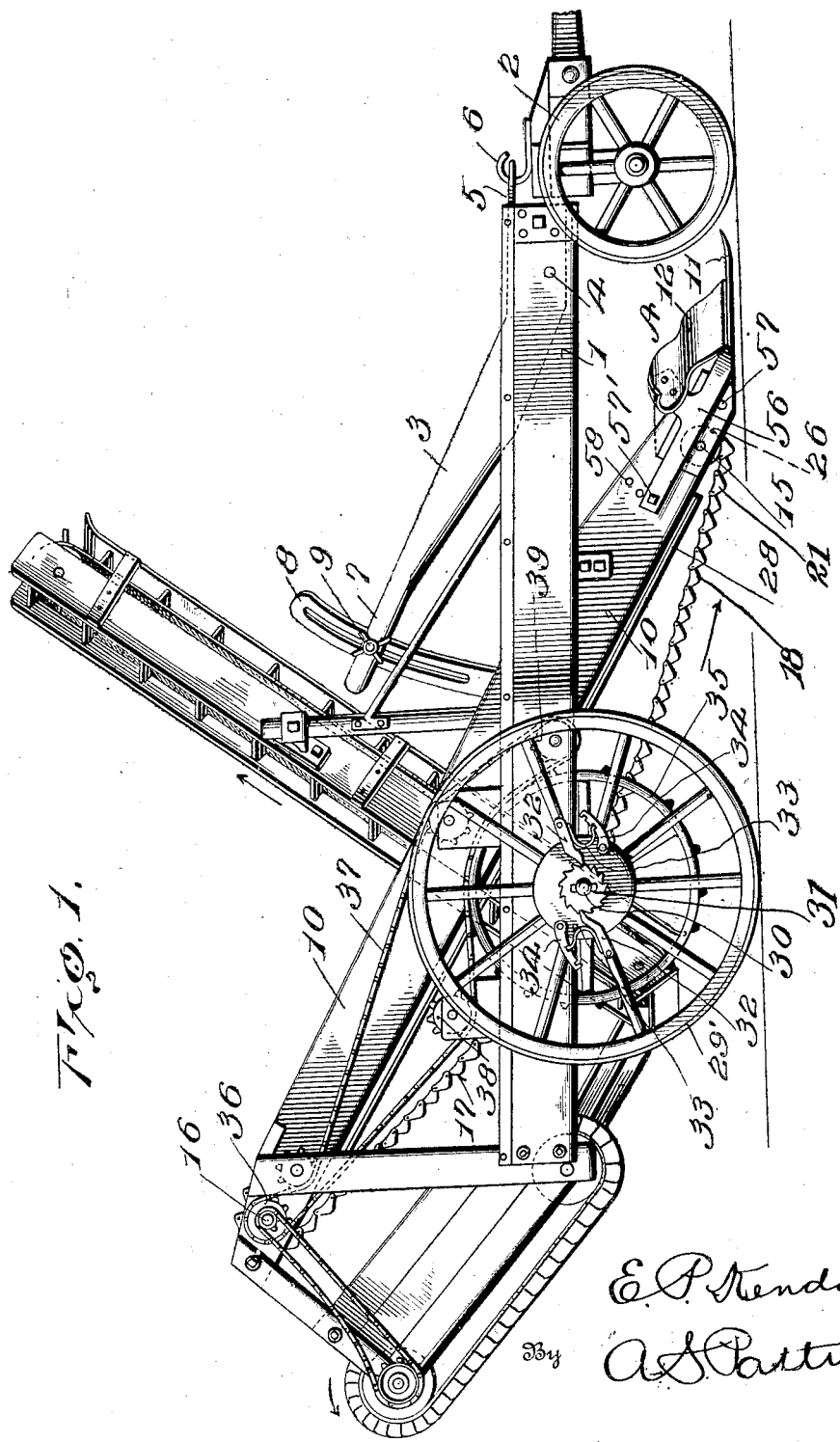

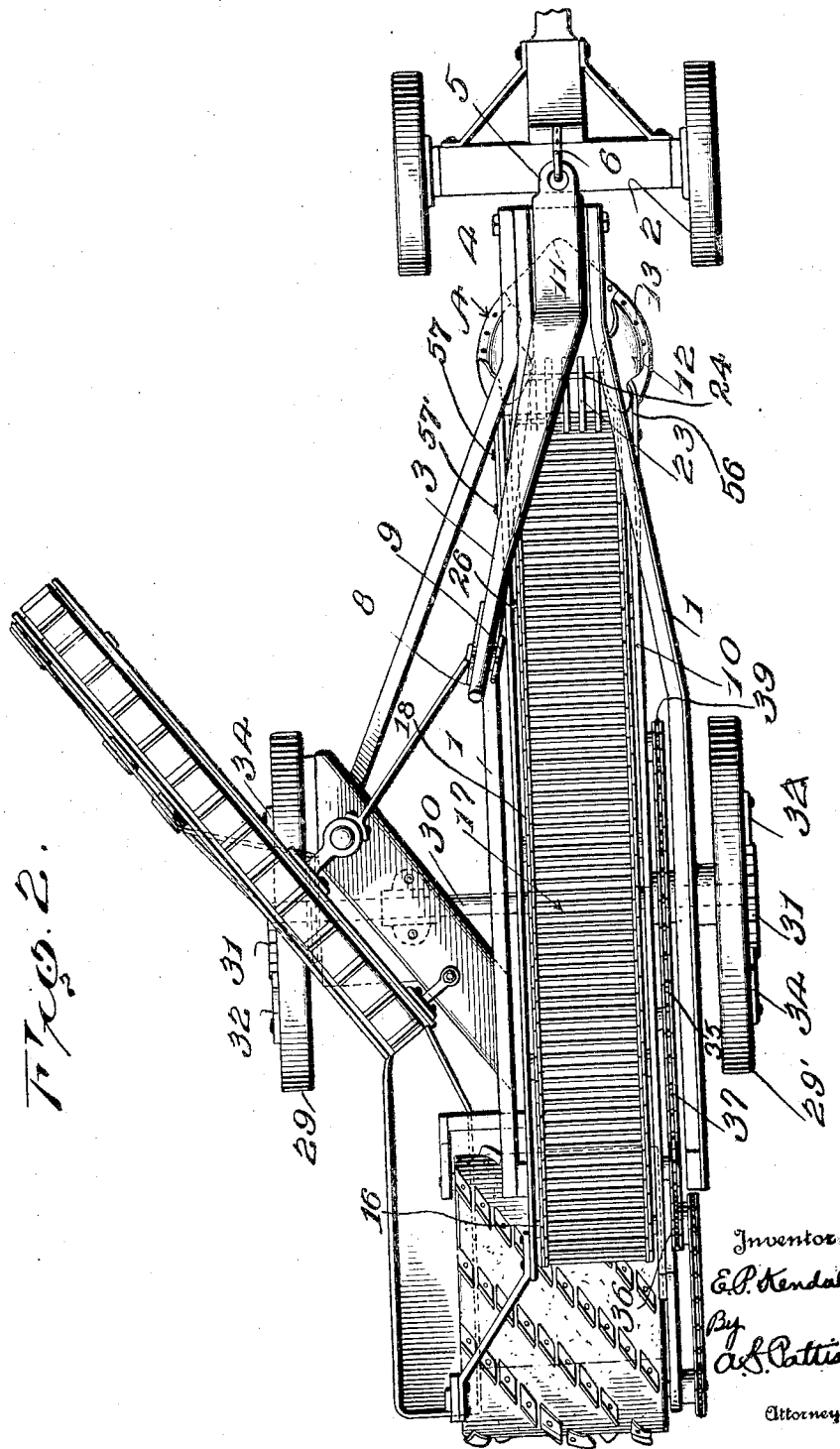

Patented Dec. 23, 1924.

1,520,577

UNITED STATES PATENT OFFICE.

EDWARD P. KENDALL, OF BOWDOINHAM, MAINE.

VEGETABLE HARVESTER.

Application filed October 19, 1920. Serial No. 418,055.

*To all whom it may concern:*

Be it known that I, EDWARD P. KENDALL, a citizen of the United States, residing at Bowdoinham, in the county of Sagadahoc and State of Maine, have invented certain new and useful Improvements in Vegetable Harvesters, of which the following is a specification, reference being had therein to the accompanying drawing.

This invention relates to improvements in vegetable harvesters, and is especially intended for harvesting potatoes, beets and other analogous vegetables.

My present invention involves a mechanism for taking the vegetables from the ground and separating them from the dirt, vines and rocks, to be delivered and separated by the machine and either deposited on the ground or in a wagon which is moving along with the harvester.

One of the objects of my invention is to provide agitator bars located between the plow and conveyor for the purpose of cutting and thoroughly loosening up the continuous furrow of earth coming in over the plow in which the vegetables are closely embedded and separating much of the earth from the vegetables as they pass on to the conveyor for subsequent separation.

A further object of my invention is to so construct and relatively locate the conveyor belt and the agitator bars, that the bars are agitated by the conveyor belt.

Another object of my invention is to provide a plow consisting of a point and upwardly and rearwardly projecting wings located at opposite sides of the plow point, whereby the earth passes through a deep narrow space as compared with the wider conveyor at the rear of the wings, whereby the shape of the earth is instantly changed into a wide thin body after passing between the wings, which greatly facilitates the operation of separating the earth from the vegetables.

A further object of my invention is to provide means for adjusting the wings in respect to each other for the purpose of narrowing or widening the space between them to suit the character of ground in which the harvester is working, and the size of the vegetables.

Further objects of my invention will appear from the following description and disclosure of my improved vegetable harvester.

In the accompanying drawings—

Figure 1 is a side elevation of my improved vegetable harvester.

Fig. 2 is a top plan view of the same.

Fig. 3 is a longitudinal, central vertical section through the plow agitator bars and lower end of the conveyor belt, showing the agitator bars in their lowest position.

Fig. 4 is a view similar to Fig. 3, showing the agitator bars in their elevated position.

Fig. 5 is a top plan view of the lower end of the conveyor and its co-operating plow and agitator bars.

In carrying out my present improvements, I provide an elongated body-frame 1, which is supported at its front end by a conventional two-wheel truck 2, to which the front end of the frame is attached through the medium of a raising and lowering lever 3. This lever 3 is pivoted to the front end of the frame 1, at the point 4, the front end of the lever carrying an eye 5, which engages a hook 6. The rear handle end 7 of the lever 3 is vertically adjustable upon a quadrant 8, which extends upward from one side of the body frame 1, the lever being bent to one side for that purpose, as clearly shown in Fig. 2. The handle end 7 of the lever 3 is clamped in its vertically adjusted position by a suitable clamp 9. The object and function of the adjustability of this lever will be explained hereinafter.

Suitably attached to the sides of the body frame 1, is an upwardly inclined conveyor frame 10. A plow A is carried by the lower end of the conveyor frame 10, and this plow comprises a point 11, which projects forwardly from the lower end of the conveyor frame 10. Adjustably attached to opposite sides of the plow point 11 are two wings 12. These wings are so curved and shaped that they extend rearwardly, inwardly and upwardly, as clearly shown in Figs. 3, 4 and 5. The forward ends of the wings are attached to the sides of the point 11 by suitable bolts 13. The opposite edges of the point 11 are provided with a plurality of vertical boltreceiving openings 14, by means of which the bolts 13 may be shifted for the purpose of moving the wings back and forth on the plow point. The edges of the plow point being tapered as shown, the forward adjustment of the wings on the point also moves them inward, as shown by dotted lines in Fig. 5. By this arrangement the single adjustment effects the double function of forward and lateral movement of the wings, the object of which will be explained hereinafter.

Passing through the lower end of the conveyor frame 10 is a shaft 15, and passing through the upper end of the conveyor frame is a shaft 16. A conveyor chain 17 passes around these shafts. This conveyor chain is composed of triangular shaped links 18, at each side of the chain, which are connected by a plurality of cross-rods. Each alternate link is provided with a cross-bar 19, at its apex, and a plurality of cross-bars 20 in a line with the cross-bar 19. The links 21 alternate with the links 18 and are provided with a plurality of cross-bars 22, intermediate their apexes and arranged in a direction transverse the links. The object and function of this arrangement of the cross-bars will be explained in connection with the operation of the machine.

A plurality of longitudinally extending agitator bars 23 have their front ends pivoted on a suitably transversely arranged bar 24, the rear ends of the agitator bars extending in the path of travel of the bars 19 of the links 18, so that the agitator bars are elevated by these bars 19, as shown in Fig. 4, and as the conveyor chain travels in the direction of the arrow of Fig. 3, these bars are permitted to drop on a transverse bar 25, as shown in Fig. 3, and the purpose of these bars will also be explained in the operation of the machine.

Located in the path of travel of the links of the conveyor chain are a plurality of rolls 26, arranged at suitable points throughout the length of the conveyor frame 10. By reason of the concaved inner edges 27 of the links, the inner apexes of the triangular links engage the rollers and the chain is slightly lifted so that it is vertically vibrated or agitated as it travels upward. A dirt guard 28 is located under the upper part of the conveyor chain and serves to shield the lower half of the machine from dirt and refuse matter falling through the chain.

Supporting and driving wheels 29 and 29′ are located on opposite ends of a shaft 30 extending transverse the body frame and suitably journaled thereto. The ends of the shaft 30 pass loosely through the hubs of the wheels and are provided with ratchet wheels 31, suitably pinned or otherwise fastened to the projecting ends of the shaft 30, whereby the wheels 29 and 29′ are loose on the ends of the shaft, while the ratchet wheels are fast to the ends of the shaft. The wheels are provided with suitable ratchets 32, engaging the ratchet wheels and these are held in engagement with the ratchet wheels by means of springs 33. The outer free end of the springs engage suitable spring hasps 34, whereby when the ends of the springs are in the inner notches of the hasps, the ratchets are held in engagement with the ratchet wheels, but are held out of engagement of the ratchet wheels by placing the ends of the springs in the outer notches of the hasps. By this construction the ratchets can be drawn out of engagement with the ratchet wheels when the machine is being driven over the highways, thus throwing the driving wheels out of operative relation with the mechanism of the machine.

The driving wheel 29′ is provided with a sprocket wheel 35, and the projecting end of the shaft 16, at the upper end of the conveyor frame is provided with a sprocket wheel 36. A sprocket chain 37 passes around the wheel 36 and guiding wheels 38 and 39, whereby the under part of the chain 37 is held in engagement with the sprocket wheel 35, so that as the machine moves forward the conveyor-chain 17 to travel this causes the conveyor-chain 17 to travel in the direction indicated by arrow in Fig. 1.

Reverting again to the plow A and referring particularly to Fig. 1, the plow point carries upwardly and rearwardly extending members 56, which are pivoted to the lower end of the conveyor frame 10, at the point 57, and the upper ends of the members 56 are adjusted by means of bolts 57′ and openings 58, whereby the plow point may be vertically adjusted to suit the conditions of the soil and digging.

The operation of my harvester is as follows: The raising and lowering lever 3 is set so that the plow is correspondingly set for the proper depth of digging, since the front end of the body frame 1 is raised and lowered through the medium of this lever 3, the body-frame oscillating on the wheel shaft 30. The plow is also set at the desired angle, through the medium of the adjustable members 56. As the machine is drawn forward, the plow enters the earth at a depth under the vegetables to be harvested and a furrow of earth moves up on the plow point 11, and is moved between the plowshares 12, which serve to contract the furrow which immediately spreads out into the wider space in rear of the plowshares 12, which action serves to disintegrate and break up the furrow. As the furrow passes between the plowshares 12, it moves over the agitator bars 23. These bars 23 are lifted upwardly by the bars 19 of the alternate links of the conveyor chain and then fall with considerable force on the bar 25. This action of the bars 23 serves to cut up the forwardly moving furrow of earth and the fall jars the earth causing it to break up and considerable of it falls through the agitator bars. As the machine moves forward, the vegetables and unseparated earth and vines are carried upward by the elevator chain 17, and as this chain travels upward it is vertically vibrated by the engagement of the inner apexes of the chain links engaging the rollers 26, as before described. This vertical movement of the chain serves to further agitate and loosen the earth around the vegetables causing it to fall through the chain onto the dirt guard 28.

Having thus described my invention, what I claim and desire to secure by Letters Patent is:—

1. A plow for vegetable harvesters, comprising a triangular-shaped point and a wing adjustably attached to opposite sides of the triangular point, for the purpose described.

2. A plow for vegetable harvesters, comprising a triangular point and a wing at each side of the triangular point, the outer ends of the wings adjustable longitudinally the sides of the point, whereby they are longitudinally and inwardly adjustable, for the purpose described.

In testimony whereof I hereunto affix my signature.

EDWARD P. KENDALL.